H. Culver.
Cultivator.

No. 87,642. Patented Mar. 9, 1869.

Witnesses:
James P Grewse
A Eddy

Inventor:
H Culver
Chipman Hosmer & Co
Attys

HIRAM CULVER, OF DANSVILLE, NEW YORK.

Letters Patent No. 87,642, dated March 9, 1869.

IMPROVEMENT IN COMBINED HARROW AND CULTIVATOR.

The Schedule referred to in these Letters Patent and making part of the same.

*To all whom it may concern:*

Be it known that I, HIRAM CULVER, of Dansville, in the county of Livingston, and State of New York, have invented a new and valuable Improvement in Combined Harrows and Cultivators; and I do hereby declare that the following is a full, clear, and exact description of the construction and operation of the same, reference being had to the annexed drawings, making a part of this specification, and to the letters and figures of reference marked thereon.

Figure 1:
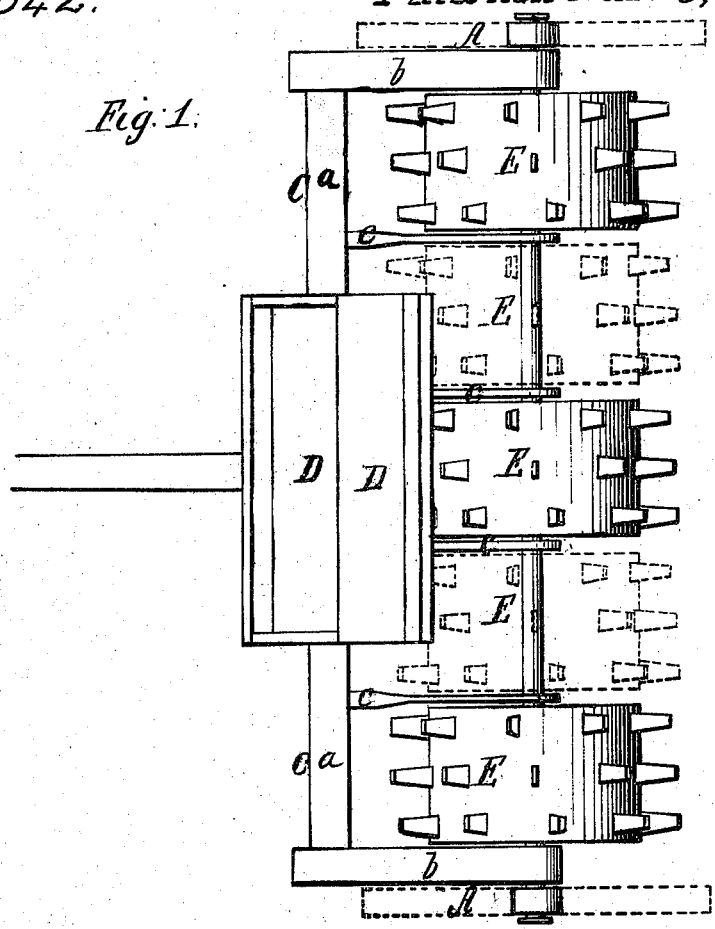

Figure 1, of the drawings, is a plan view of my device, and

Figure 2:
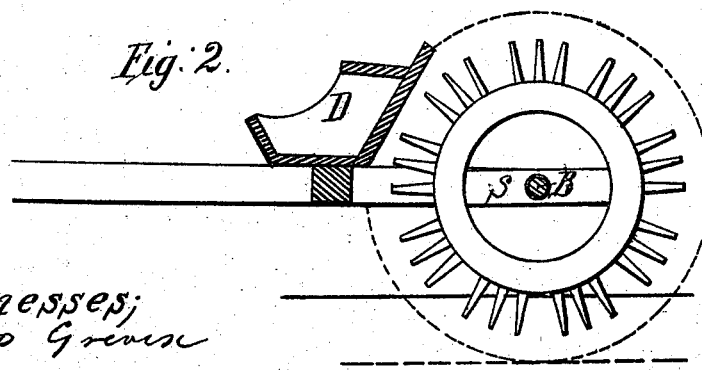

Figure 2 is a sectional view, showing the end of one of my cylindrical harrows.

My invention relates to devices intended for use in cultivating corn, and other growing plants; and It consists in constructing and adjusting a series of cylindrical harrows upon a shaft, in such manner that a portion thereof may be removed, at will, to the end that the remaining harrows may be operated as a cultivator.

The letter A, of the drawings, represents cart or sulky-wheels, and

Letter B is the axle or shaft, upon which they rotate.

These wheels are adjusted on the shaft for purposes of transportation only, and are removed, and washers substituted in their places, when the work of harrowing or cultivating is about to commence.

The letter C is a frame, consisting of front cross-bar $a$, side arms $b$, and lateral arms $c$, the arms $b$ and $c$ being attached to the shaft B in the manner shown, and serving as bearings in which said shaft rotates.

The driver's seat is marked D on the drawings, and is attached to the cross-bar $a$ in the manner shown.

The letters E are a series of cylindrical harrows adjusted respectively upon the shaft B by means of the slats $s$, one of which is attached to each end of the harrows E, as shown on fig. 2, the shaft resting in the openings in the centre thereof.

The arms $c$ pass between these harrows respectively from the front cross-bar to the shaft, and serve as means for permanent separation between them.

To operate my device as a harrow, the wheels A are removed, suitable washers placed on the shaft in their places, and the machine drawn forward.

To operate my device as a cultivator, I remove alternate harrows, as indicated by those marked in red on fig. 1.

The space between the harrows, thus formed by the removal of alternate ones, allows the operator to draw the machine over standing rows of corn, and cultivate on each side thereof.

If the removal of alternate harrows does not furnish the space required, or adapt the machine to the rows of corn, I remove more or less of the harrows, to suit the case.

What I claim as my invention, and desire to secure by Letters Patent, is—

A series of cylindrical rotary harrows, adjusted upon a shaft, as described, separated by the arms $c$, and adapted for the removal of any number thereof, at will, in the manner represented, and for the purposes herein specified, substantially as described.

In testimony that I claim the above, I have hereunto subscribed my name, in the presence of two witnesses.

HIRAM CULVER.

Witnesses:
  SETH N. HEDGES,
  D. W. NOYES.